C. P. BRONSON.
CAR FENDER.
APPLICATION FILED SEPT. 30, 1909.
958,473.
Patented May 17, 1910.
2 SHEETS—SHEET 1.
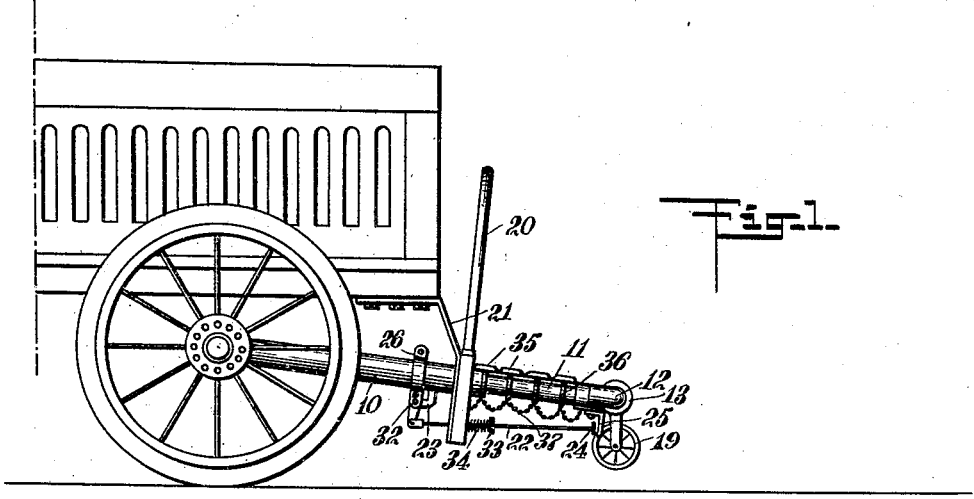
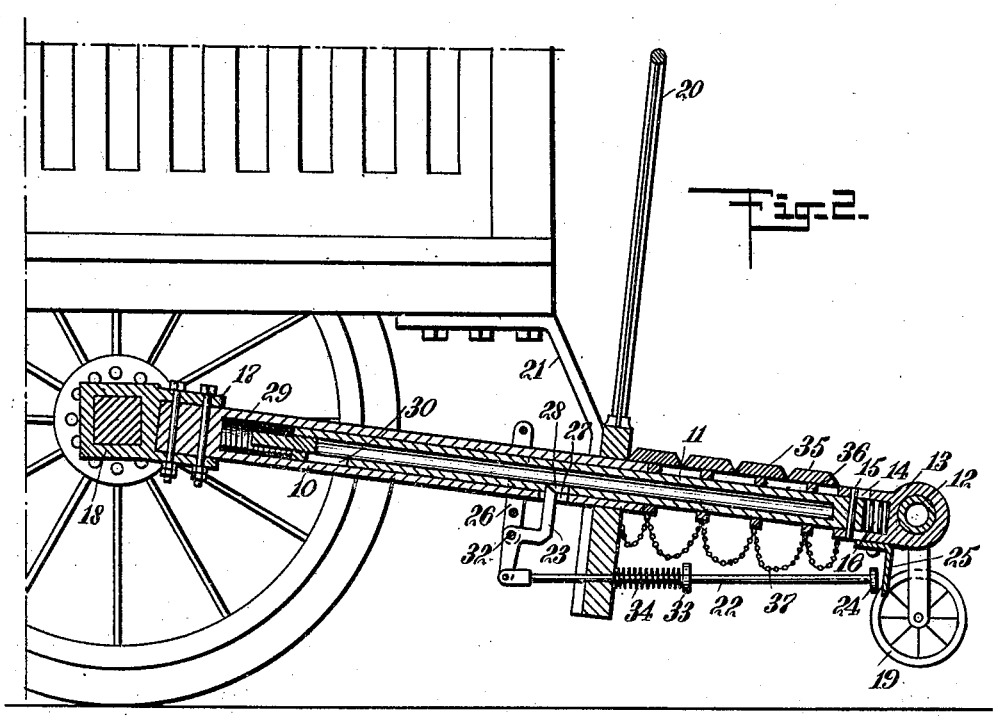
WITNESSES
INVENTOR
Clarence P. Bronson
BY
ATTORNEYS C. P. BRONSON.
CAR FENDER.
APPLICATION FILED SEPT. 30, 1909.
958,473.
Patented May 17, 1910.
2 SHEETS—SHEET 2.
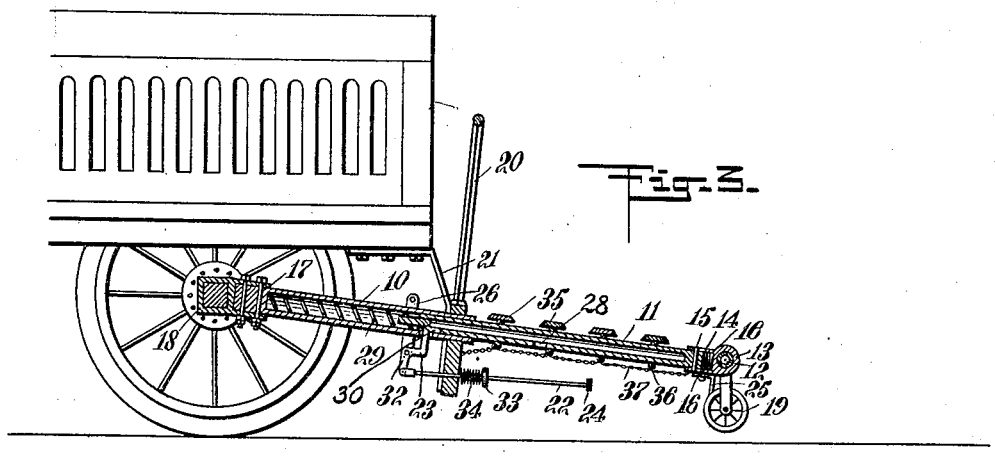
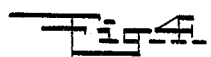
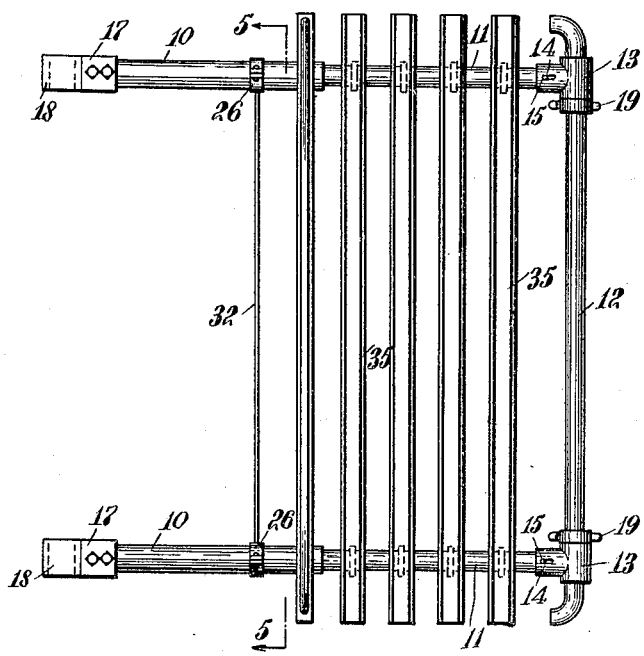
WITNESSES
INVENTOR
Clarence P. Bronson
BY
ATTORNEYS

UNITED STATES PATENT OFFICE.

CLARENCE P. BRONSON, OF CORNING, NEW YORK.

CAR-FENDER.

958,473.  Specification of Letters Patent.  Patented May 17, 1910.

Application filed September 30, 1909. Serial No. 520,312.

*To all whom it may concern:*

Be it known that I, CLARENCE P. BRONSON, a citizen of the United States, and a resident of Corning, in the county of Steuben and State of New York, have invented a new and Improved Car-Fender, of which the following is a full, clear, and exact description.

The invention is an improvement in fenders, more especially designed for automobiles, and has in view a comparatively light fender, which, when in normal position, is compactly arranged and projects a relatively small distance beyond the front of the vehicle, and, when striking a body, is automatically forwardly extended to receive and support the object struck. To this end I provide a telescopic tubular fender frame having means tending to force the frame sections apart, with the forward section of the frame having a bed extensible and contractible with the extension and contraction of the frame, and means to lock the fender in contracted position, automatically released when the front portion of the fender strikes a person or other object of substantial firmness.

Reference is to be had to the accompanying drawings forming a part of this specification, in which similar characters of reference indicate corresponding parts in all the views.

Figure 1 is a side view of the forward portion of an automobile, showing a fender embodying my invention applied thereto; Fig. 2 is a similar view of the same on an enlarged scale, showing the fender in vertical section and in normal and contracted position; Fig. 3 is a sectional view similar to Fig. 2, showing the fender extended; Fig. 4 is a plan of the fender removed from the car; and Fig. 5 is a section on the line 5—5 of Fig. 4, looking in the direction of the arrows.
The fender embodies in its construction an extensible and contractible frame having telescoping side bars each composed of an inwardly-arranged tubular section 10 and an outwardly-arranged tubular section 11, the outer sections being connected together at their outer ends by a front cross-bar 12, the connection between the side bar sections and the cross-bar 12 being effected by providing the latter with tees 13 near each end, the tees receiving the ends of the bars 11 and having a limited sliding movement thereon afforded by the slots 14 and the pins 15, the slots being formed within the tees and the pins carried by the side bar sections 11 and extending into the slots. Between the outer ends of the side bar sections 11 and the tees 13 are interposed springs 16, tending to force the front cross-bar 12 to the limit of its outward movement. The inner ends of the inner side bar sections 10 are made solid and fit within sockets 17 of collars 18, the latter being secured at suitable points to the front axle of the vehicle. The front cross-bar 12 is extended at each end slightly beyond the side bars of the frame, with the extended portions rearwardly curved to give the fender a finish, and each carrying at the under side a small wheel 19, operating to first strike the ground and support this end of the fender, should the fender be moved sufficiently near the ground surface.

Directly at the front of the vehicle is an upwardly-extended guard 20, preferably embodying the usual wire - supporting frame, with the base of the guard arranged on the side bar sections 10 and rigidly supported from the bumper of the car by braces 21. The base of the guard 20 is extended below the fender frame and serves as a support for slidable push-bars 22, the latter being operatively connected at the inner ends to triggers 23, and provided at their outer ends with enlargements or heads 24, operatively arranged with respect to depending flanges 25 fixed to the front cross bar 12. The triggers 23 are fulcrumed at the lower side of clamps or rings 26, secured to the side bar sections 10, the upper portion of the trigger being offset and provided with a downwardly and outwardly beveled end movable within slots 27 and 28, formed in the side bar sections 10 and 11 respectively, to lock the fender frame in contracted position. The two sections of the side bars are normally forced apart by springs 29, interposed between them, as shown in Figs. 2 and 3. Slots 30 are formed in the outer sections 11 of the side bars, inwardly of the slots 28, and are arranged to be engaged by the trigger 23 and limit the outward movement of the side bar sections 11 when the fender frame is extended under the influence of the springs 29. The pivots of the triggers 23 are formed by a tie-rod 32, connecting the rings 26 together. In order that the triggers may be held in and returned to engaging position when withdrawn from the side bar sections, the push-bars 22 are provided with collars or other enlargements 33, between which and the base of the upwardly-projecting guard are springs 34, tending to force the push-bars outwardly.

The outer sections 11 of the side bars carry a bed composed of a number of cross-slats 35, each slat having a ring or collar 36 attached to its under side near each end, slidable on the respective sections 11, with the rings on each section of the side bar connected at points along the length of a chain 37, the ends of the chain being respectively secured to the inner fixed portion and the forward movable portion of the fender, the chains serving to limit the separation of the slats and drawing them a uniform distance apart when the fender is extended, the slats moving close together when the fender is contracted, as shown in Figs. 1 and 2. With the fender in this position, on striking a person or other object of substantial firmness, the front cross-bar is forced inwardly, breaking the shock to the body and fender and moving the flanges 25 against the push-bars 22 and disengaging the triggers from the outer sections of the side bars. As the triggers are disengaged, the outer sections of the side bars are forcibly extended in a position to receive the object struck, the extension of the fender being limited by the reengagement of the triggers in the slots 30 of the outer sections of the side bars. In the outward movement of the outer side bar sections, the slats forming the bed to receive the body, are successively spread apart until they are uniformly distributed over the forward portion of the fender, as shown in Figs. 3 and 4. By pushing on the front of the fender, when the latter is extended, the outer edges of the slots 30 press against the beveled ends of the triggers and disengage them, allowing the fender to be fully contracted, at which time the triggers are again returned into the slots 28 and lock the fender in its contracted position.

Having thus described my invention, I claim as new and desire to secure by Letters Patent:

1. The combination of a fender frame of telescoping sections, means tending to force the sections apart, an extensible and contractible bed carried by the outer section of the frame presenting a flat upper face in both the extended and contracted positions, means to lock the sections of the frame together when the fender is contracted, and means to automatically disengage the last mentioned means when the fender strikes an object.

2. The combination with a car, a fender comprising inner and outer telescoping frame sections, and cross slats slidable on the outer section of the frame, providing an extensible and contractible bed, said bed being disposed beyond the forward end of the car body in both its extended and contracted positions.

3. The combination of an extensible and contractible fender frame, means tending to force the frame to an extended position, cross-slats slidable on the forward portion of the frame, means to lock the frame in contracted position, and means to draw the slats apart on the forward portion of the frame when the fender is extended upon the release of the locking means.

4. The combination of a fender frame having telescoping side bar sections, springs interposed between the said sections tending to force them apart, a contractible and extensible bed carried on the outer section of the side bars, triggers arranged to lock the sections of the side bars together against the tension of the springs, and forwardly-extending push-bars operatively connected to the triggers and operatively arranged with respect to the forward portion of the frame.

5. The combination of an extensible and contractible fender frame having a spring-pressed front portion, triggers arranged to lock the frame in contracted position, and forwardly-extending push-bars operatively connected to the triggers and arranged to be actuated by the spring-pressed front portion of the frame.

6. The combination of axle fastenings having sockets, a frame having side bars, each of telescoping sections, means normally forcing the sections of the side bars apart, said frame having a front portion carried by the outer sections of the side bars and inwardly yielding independent of said means, a trigger arranged to lock the sections of the side bars against the tension of the said means, and a push-bar operatively connected to the trigger and operatively arranged with respect to the inwardly-yielding front portion of the frame.

7. The combination of fender side bars, each of telescoping sections, slats arranged crosswise of the side bars and slidable on the outer sections thereof, means tending to force the sections of the side bars apart, a trigger arranged to lock the side bars in contracted position, and flexible connections between the several slats and the fixed and movable portions of the side bars, to successively move the slats apart when the side bars are extended.

8. The combination of fender side bars, each composed of telescoping sections, means tending to force the sections of the side bars apart, an inwardly-yielding cross-bar carried on the outer ends of the outer sections of the side bars, having a downwardly-projecting member, a trigger carried by the inner section of one of the side bars, and a push-bar slidably supported below the side bars, operatively connected to the trigger and extending forwardly to a point adjacent to said member when the side bars are contracted.

9. The combination of a fender frame having side bars, each composed of telescoping sections, a slidably-supported push-bar arranged below the side bars, means tending to force the sections of the side bars apart, an inwardly-yielding front bar carried on the outer ends of the outer sections of the side bars, having a downwardly-extending portion adapted to engage the outer end of the push-bar when the cross-bar is forced inwardly, and a trigger arranged to engage the outer section of one of the side bars and lock it in extended and retracted position, operatively connected to the push-bar.

10. In combination with a vehicle having a front axle, an extensible fender frame carried on the front axle and having side bars, each composed of telescoping sections, an extensible bed carried on the outer sections of the side bars, means tending to force the side bars apart, an upwardly-extending bar arranged on the inner sections of the side bars, an inwardly-yielding cross-bar carried on the outer ends of the outer sections of the side bars, a trigger arranged to lock the sections of the side bars together when the frame is contracted, and means to release the trigger, arranged operatively with respect to the inwardly-yielding cross-bar.

11. In combination with a car, a fender comprising inner and outer telescoping frame sections permanently secured to the car in a forwardly and downwardly inclined position, an upright guard fixed relatively to the inner section of the frame at the front of the car, and a bed extensible and contractible with the extension and contraction of the frame and slidably arranged on the outer frame section in advance of the guard.

In testimony whereof I have signed my name to this specification in the presence of two subscribing witnesses.

CLARENCE P. BRONSON.

Witnesses:
CLINTON W. HEERMANS,
FRED. A. WALKER.